(12) United States Patent
Picone

(10) Patent No.: US 6,210,044 B1
(45) Date of Patent: Apr. 3, 2001

(54) TRANSMISSION FLOATING BEARING CARRIER

(75) Inventor: Kenneth T. Picone, Pinehurst, NC (US)

(73) Assignee: ZF Meritor, LLC, Laurinburg, NC (US)

( * ) Notice: Subject to any disclaimer, the term of this patent is extended or adjusted under 35 U.S.C. 154(b) by 0 days.

(21) Appl. No.: 09/264,252

(22) Filed: Mar. 8, 1999

(51) Int. Cl.[7] .................................................. F16C 23/06
(52) U.S. Cl. ................................. 384/583; 384/626
(58) Field of Search .................................. 384/626, 571, 384/583, 584

(56) References Cited

U.S. PATENT DOCUMENTS

| | | | |
|---|---|---|---|
| 2,627,120 | * | 2/1953 | Hotchkiss ............................. 384/583 |
| 4,336,969 | * | 6/1982 | Kahlert et al. ....................... 384/626 |
| 5,115,558 | * | 5/1992 | Bernhardt et al. ................... 384/626 |
| 5,161,904 | * | 11/1992 | Craft ..................................... 384/583 |
| 5,806,367 | * | 9/1998 | Kato ..................................... 384/583 |

* cited by examiner

Primary Examiner—Sherry Estremsky
(74) Attorney, Agent, or Firm—Carlson, Gaskey & Olds

(57) ABSTRACT

A transmission for use in a vehicle has a housing with a center support and an opening. The transmission further comprises first and second shafts that extend coaxially along an axis and have adjacent ends disposed within the opening. A bearing assembly supports the adjacent ends within the opening while being movable along the axis relative to the center support. This permits the second shaft to be adjusted along the axis relative to the first shaft upon assembly thereby eliminating the need for an additional shimming operation.

16 Claims, 6 Drawing Sheets

TRANSMISSION FLOATING BEARING CARRIER

BACKGROUND OF THE INVENTION

This invention relates to an improved bearing assembly for supporting the main and auxiliary countershafts in a manual transmission.

Prior art manual transmissions require that two shimming operations be applied on two bearing arrangements supporting the main and auxiliary shafts when the main and auxiliary countershafts are installed in the transmission housing. Shimming adjusts the tolerance along the shafts' axis so that the bearings do not wear too quickly. Typically, one end of the housing has a bearing that is grounded, or unshimmed, and which supports one end of the main shaft. The other end of the main shaft is supported at a housing center support by a bearing arrangement that must be shimmed before the auxiliary shaft may be installed.

This shimming operation is accomplished by preloading the main shaft to obtain the desired tolerance and determine the correct shim size to achieve that tolerance. Once shimmed, the bearing is fixed in the center support. The auxiliary shaft is then installed with one end supported in the center support. A preload is applied to the auxiliary shaft to obtain the desired tolerance and determine the ideal shim size for the auxiliary shaft. The other end of the auxiliary shaft must then be shimmed to ensure that the correct tolerance is obtained for the auxiliary shaft.

Thus, for a two shaft arrangement, all the bearings are fixed to the housing and each shaft is shimmed individually.

SUMMARY OF THE INVENTION

The invention provides a transmission for use in a vehicle comprising a housing having a center support with an opening. The transmission further comprises first and second shafts that are coaxial along an axis and have adjacent ends disposed within the opening. A bearing assembly supports the adjacent ends within the opening while being movable along the axis relative to the center support. This permits the second shaft to be adjusted along the axis relative to the first shaft upon assembly, thereby eliminating the need for an additional shimming operation at the center support. That is, the first shaft does not have to be shimmed after being installed. Rather, the second shaft may be installed and the correct tolerance for the first and second shaft determined simultaneously by applying a preload to the second shaft. The bearing assembly moves along the axis during this adjustment and a shimmed bearing is installed to retain the correct tolerance in the shafts.

BRIEF DESCRIPTION OF THE DRAWINGS

Other advantages of the present invention may be understood by reference to the following detailed description when considered in connection with the accompanying drawings wherein.

DETAILED DESCRIPTION OF THE PREFERRED EMBODIMENT

Figure 1:
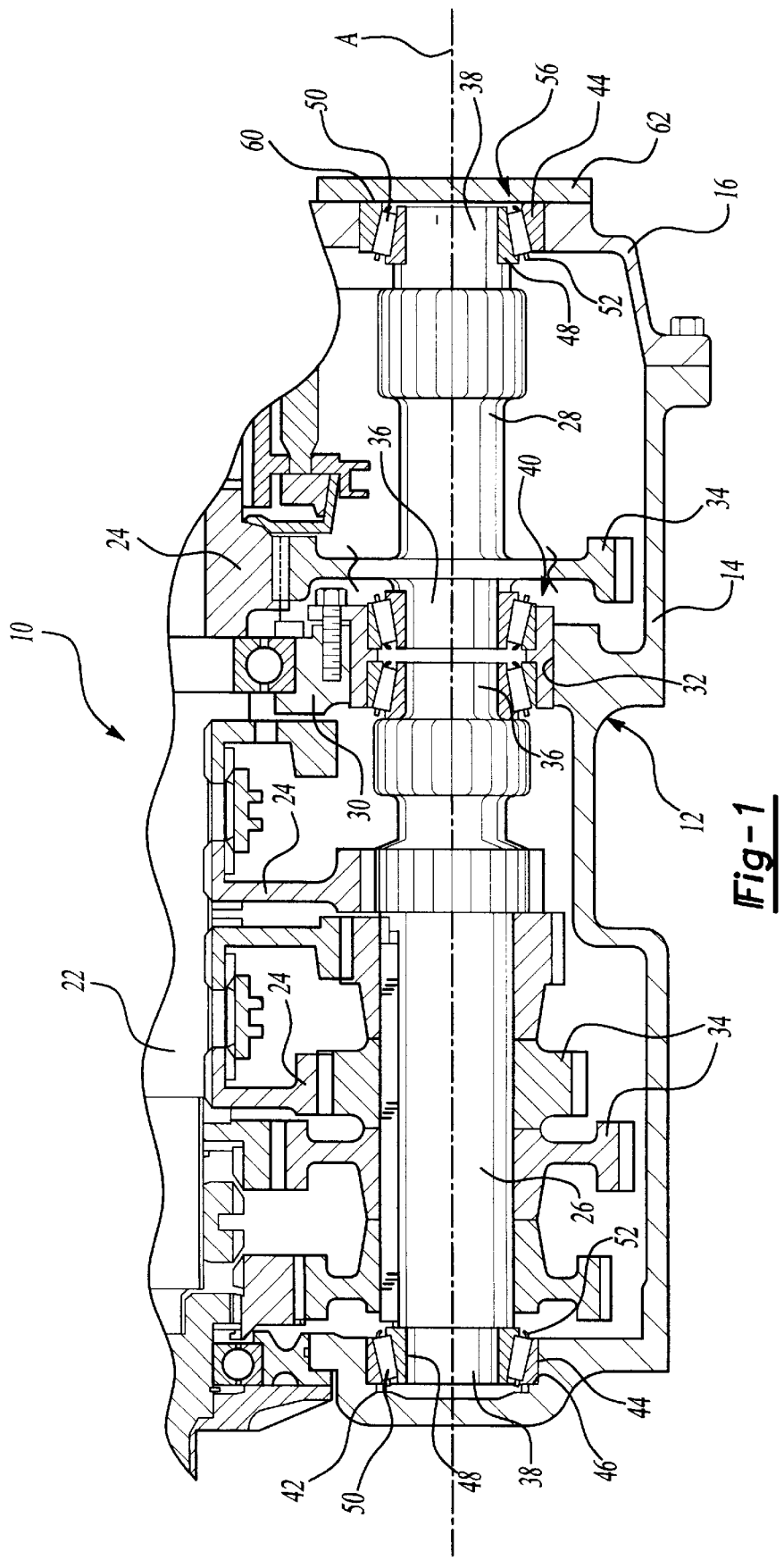
FIG. 1 is a cross-sectional view of a partially broken away view of a manual transmission.

Throughout the disclosure, like numerals are intended to indicate like or corresponding parts. A transmission for use in a vehicle is generally shown at 10 in FIG. 1. The transmission 10 has a housing 12 that includes a main portion 14 and a end portion 16 to facilitate the installation of the transmission components into the housing 12. The portions 14,16 are fastened together to enclose and seal the transmission components from the outside environment. The transmission 10 further comprises a main shaft 22, partially shown in FIG. 1, that carries a plurality of gears 24.

First 26 and second 28 shafts are coaxial along an axis A, which is parallel to the main shaft 22. The first 26 and second 28 shafts, or main and auxiliary countershafts respectively, mount a plurality of gears 3 that engage the plurality of gears 24 on the main shaft 22. The first 26 and second 28 shafts have adjacent ends 36 and opposite ends 38 that oppose the adjacent ends 36 of each shaft 26,28. The main portion 14 of the housing 12 has a center support 30 with an opening 32. The adjacent ends 36 are disposed within and supported in the opening 32 while the opposite ends 38 are supported elsewhere by the housing 12.

The transmission 10 further includes a bearing assembly 40 for supporting the adjacent ends 36 within the opening 32. The bearing assembly 40 fits closely within the opening 32. That is, the bearing assembly 40 has a tight slip fit within the opening 32. Bearing assembly 40 is movable along axis A relative to center support 30 for permitting the second shaft 28 to be adjusted along axis A relative to the first shaft 26 upon assembly. With bearing assembly 40 capable of sliding within the opening 32, as opposed to being fixed along axis A within the opening like prior art transmissions, a shimming operation may be eliminated when installing the first 26 and second 28 shafts in the housing 12.

A bearing 42 is interposed between the opposite end 38 of the first shaft 26 and the housing 12. Specifically, a cup 44 is pressed into one end of the main portion 14 of the housing 12 and into abutment with a shoulder 46 thereby locating the cup 44 along axis A. A cone 48 is pressed onto the opposite end 38 of the first shaft 26, and a set of rollers 50 are radially located about the cone 48 and retained by a cage 52.

A bearing 56 is interposed between the opposite end 38 of the second shaft 28 and the housing, 12. Specifically, a cone 48 is pressed onto the opposite end 38 of the second shaft 28. A set of rollers 50 is radially located about the cone 48 and retained by a cage 52. The cup 44 is pressed into one end of the end portion 16 of the housing 12. Thus, the opposite end 38 of the second shaft 28 is supported by the cup 44. A shim 60 abuts the cup 44 to maintain the ideal tolerance of the shafts 26,28 along axis A. An end cap 62 is adjacent to the shim 60 and affixed to the end portion 16 thereby preventing the shafts 26,28 from shifting along axis A.

Figure 2A:
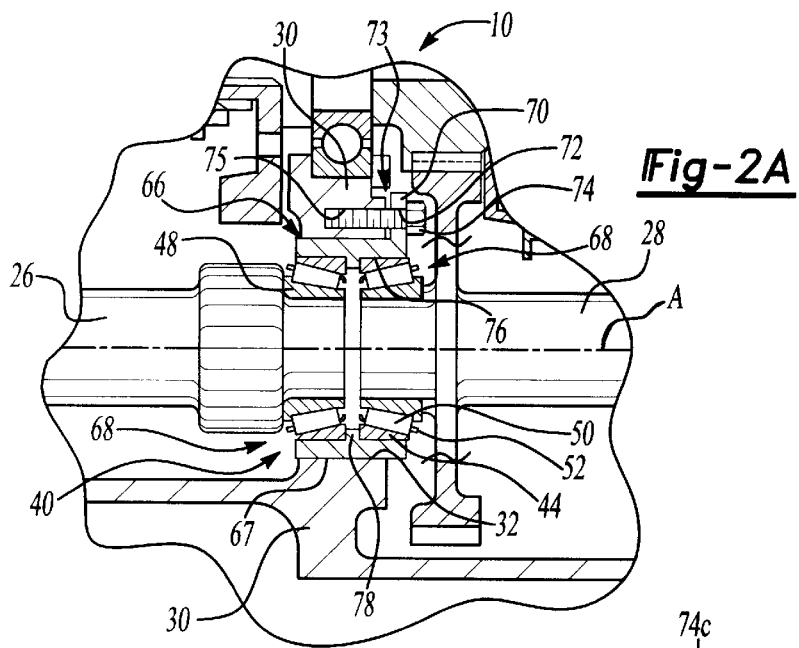
FIG. 2A is an enlarged view of the present invention as shown in FIG. 1.
Figure 3:
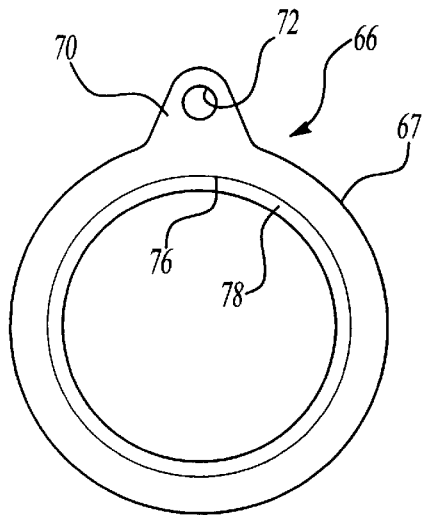
FIG. 3 is an end view of the carrier shown in FIG. 1.

Referring now to FIG. 2A, the bearing assembly 40 is shown in greater detail. The bearing assembly 40 includes a carrier 66 disposed within the opening 32 for sliding therein along axis A. The carrier 66 has an outer surface 67 that acts a sleeve bearing with the opening 32. The carrier 66 includes a flange 70 that extends radially from the outer surface and generally parallel with center support 30. FIG. 3 more clearly depicts the flange 70 extending from the carrier 66. The flange 70 has an aperture 72 with a fastener 74 disposed within the aperture 72 and connected to the center support 30 thereby anchoring the carrier 66 to the center support 30.

The fastener 74 is parallel with axis A thereby permitting the carrier to move along axis A while preventing the carrier from rotating about axis A. There is a gap 73 between the flange 70 and the center support 30 so that the carrier 66 may move relative to the center support 30 when the shafts 26,28 are being shimmed to the ideal tolerance.

Figure 2B:
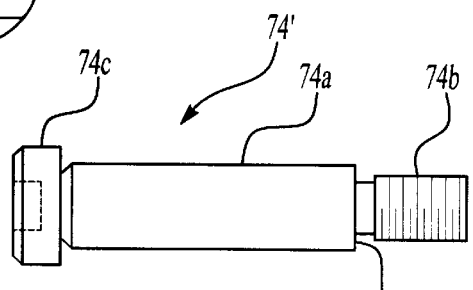
FIG. 2B is a preferred embodiment of the fastener shown in FIG. 2A.

Referring to FIG. 2B, a preferred embodiment of a fastener is shown at 74'. The fastener 74' is a shoulder boll having a bearing portion 74a with a threaded portion 74b at one end and a head 74c opposite the threaded portion 74b. Bearing portion 74a slidingly engages the aperture 72 within the carrier 66. The head 74c may be of any configuration suitable for permitting a tool to engage the fastener head and install the fastener 74' into a ore 75 in the center support 30. A stop 74d is formed where the bearing 74a and threaded 74b portions meet which ensures that the fastener 74' is installed into the bore 75 to a predetermined position. That is, with the bearing portion length from the head 74c to the stop 74d and the flange width as controlled values the gap 73 will be the same for each installation.

The carrier 66 further includes an inner surface 76 with an annular lip 78 radially extending from the center of the inner surface 76. Bearings 68 are interposed between the inner surface 76 of the carrier 66 and the adjacent ends 38 for reducing the friction between the shafts 26,28 and the carrier 66 when the shafts 26,28 rotate about axis A. The bearings 68 are of the same type of roller bearings utilized on the opposite ends 38. Similar to bearings 42,56, the cones 48 are pressed onto the shafts 26,28. A set of rollers 50 is radially located about each cone 48 and retained by a cage 52. A cup 44 is pressed into the inner surface 76 of the carrier 66 on either side of the annular lip 78 and into abutting relationship with the lip 78. In this manner, the bearings 68 are grounded to the carrier 66 thereby preventing the bearings 68 from moving along axis A relative to the carrier 66. Thus, the bearings 68 are adjusted axially via the carrier 66 only.

Figure 4:
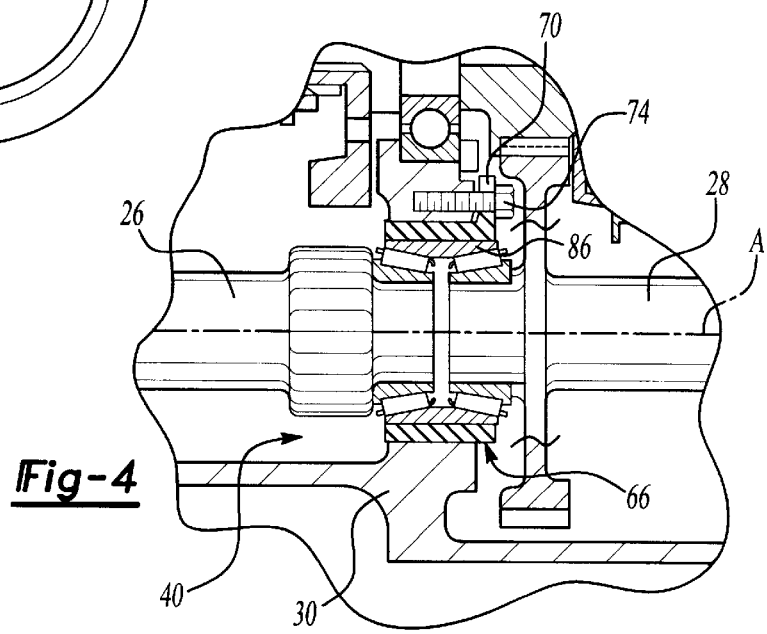
FIG. 4 is an alternative embodiment of the present invention similar to FIG. 2A.

In an alternative embodiment, shown in FIG. 4, the annular lip 78 may be eliminated from the carrier 66 and a single cup 86 may be shared by both shafts 26,28. The cup 86 is pinned or fixed to the carrier 66 to prevent relative movement between the cup 86 and the carrier 66.

Figure 5A:
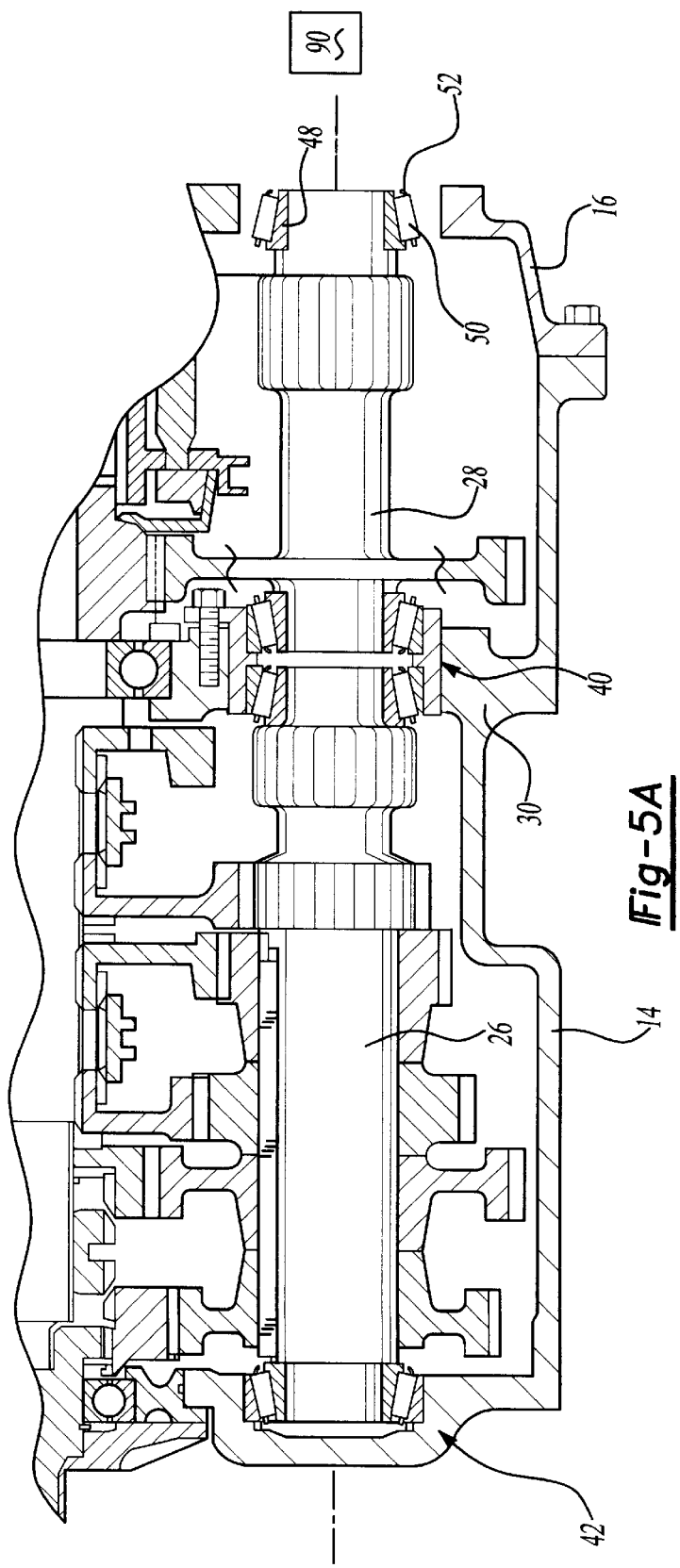
FIG. 5A is a view showing an initial stage of assembly.

Referring now to FIGS. 5A–5D, during assembly the first shaft 26 is installed in the housing 12 so that the opposite end 38 of the first shaft 26 is supported by the bearing 42, as shown in FIG. 5A. Bearing 42 is grounded so that the opposite end 38 of the first shaft 26 is unshimmed since it is not adjusted along axis A during installation of the first shaft 26. The bearing assembly 40 is installed in the opening 32 so that the bearing assembly 40 is interposed between the opening 32 and the adjacent end 36 of the first shaft 26.

The second shaft 28 is installed with the adjacent end 38 of the second shaft 28 disposed within the bearing assembly 40. In this manner, the adjacent ends 38 of the first 26 and second 28 shafts are supported by the bearing assembly 40. With the end portion 16 installed onto the housing 12, the device 90 applies a preload, as is known in the art, to move the shafts 26, 28 and the bearing assembly 40 to their ideal tolerance as indicated by the large arrows (see FIG. 5B) so that the ideal bearing location for bearing 56 may be determined along with the correct shim size.

Figure 5B:
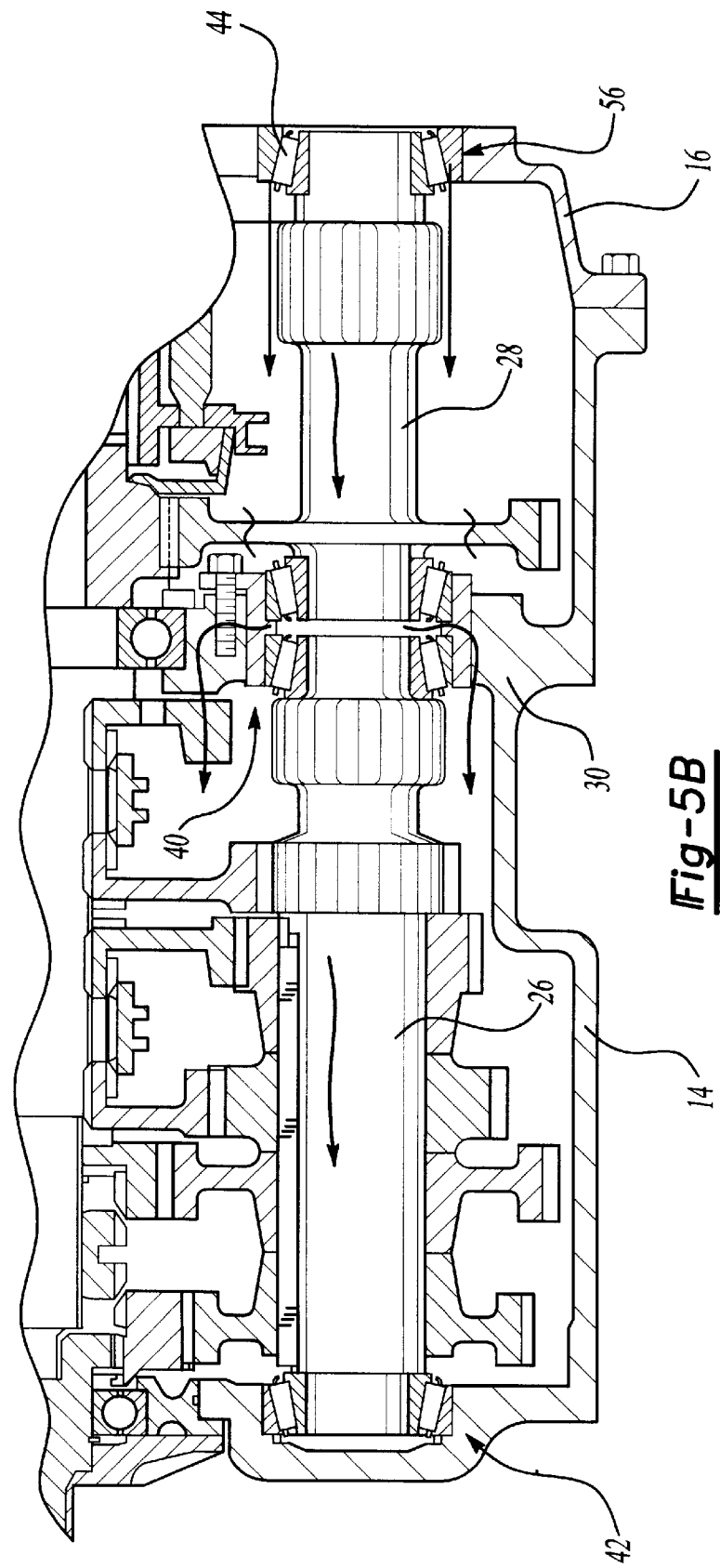
FIG. 5B is a view showing bearing installation.
Figure 5C:
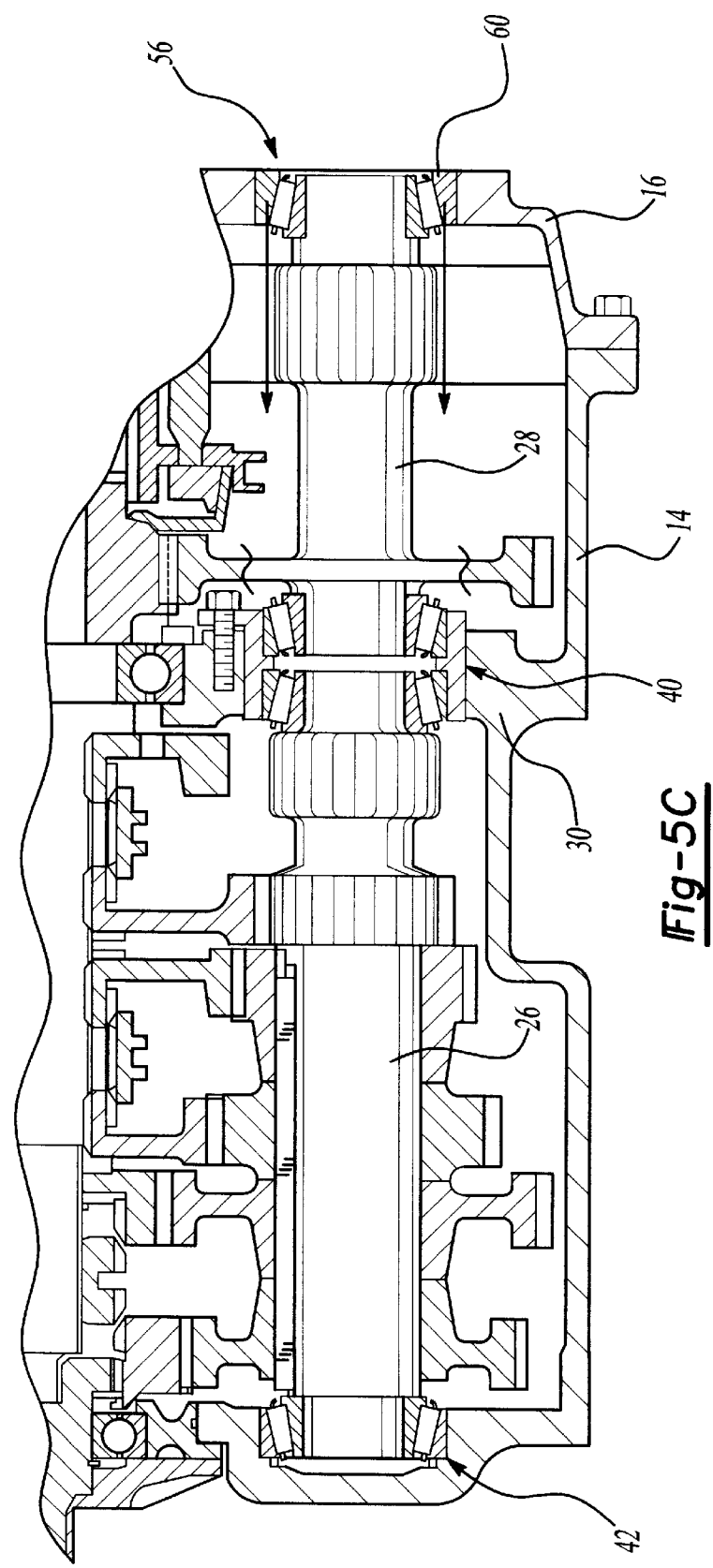
FIG. 5C is a view showing shim installation.
Figure 5D:
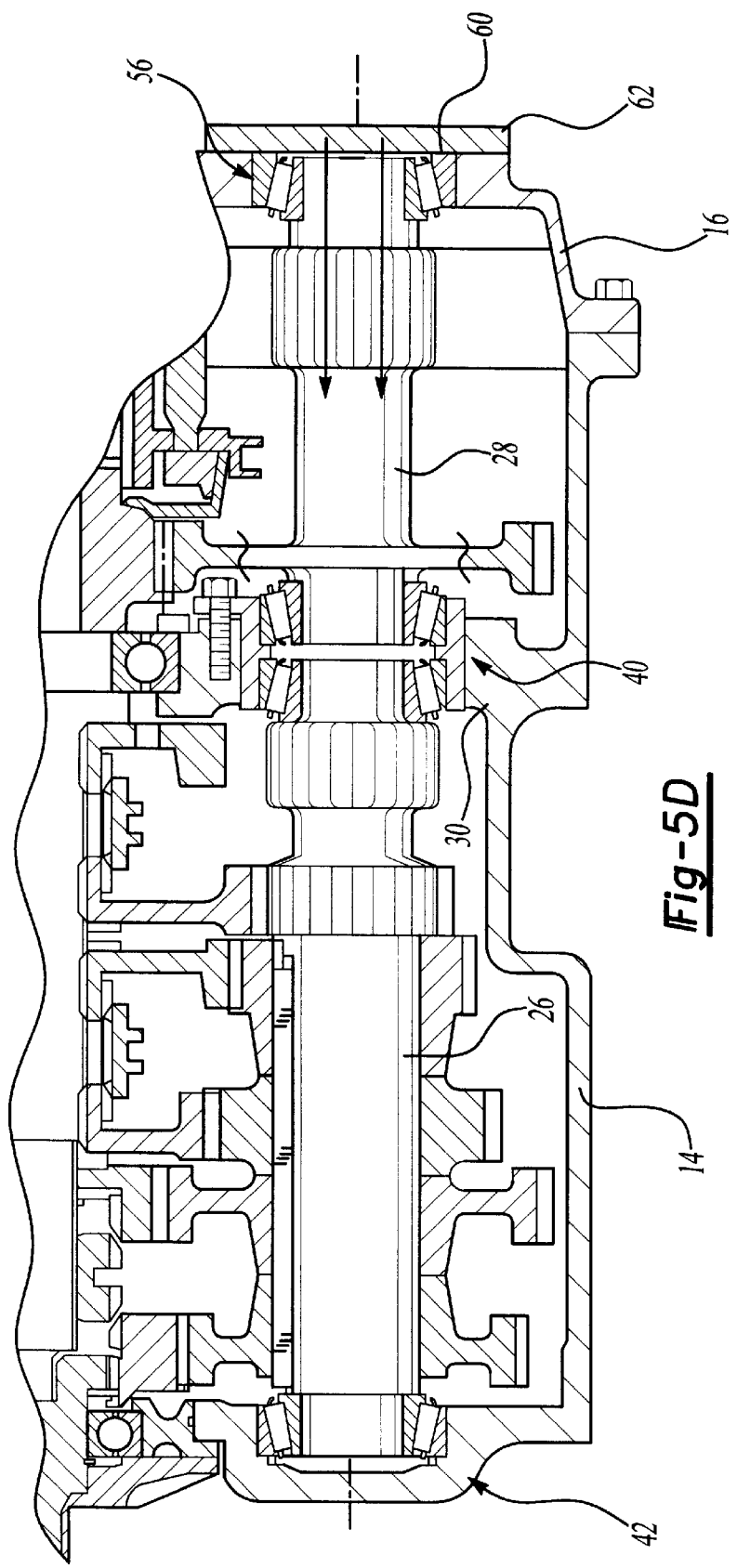
FIG. 5D is a view showing the final assembly.

Referring to FIG. 5B, the bearing 56 is then installed in the desired bearing location where the shafts 26,28 will be positioned at a tolerance at which the bearing wear is minimized. The shim 60 of the appropriate size is installed adjacent to the bearing 56, as shown in FIG. 5C. Finally, as shown in FIG. 5D the end cap 62 is affixed to the end portion 16 in abutting relation to the shim 60 to seal the transmission 10 and to prevent the shafts 26,28 from shifting along axis A during transmission operation. In this manner, the opposite end 38 of the second shaft 28 is shimmed thereby adjusting the tolerance of both shafts 26,28 along axis A.

It is to be understood that the particular order of assembly or installation of the transmission components is not important and it will be appreciated by one skilled in the art that the scope of the invention is not thereby affected. Moreover, it is not important whether it is the main or the auxiliary countershaft that is shimmed. The important aspect of the invention is that a first shaft is supported at one end by an unshimmed bearing and the other end is supported by a movable unshimmed bearing. Further, one end of a second shaft is supported by the same movable unshimmed bearing while the other end is supported by a shimmed bearing. It is also to be understood that the present invention may apply to arrangements having more that one shaft.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

I claim:

1. A transmission for use in a vehicle comprising:
   a housing having a center support with an opening;
   first and second shafts being coaxial along an axis and having adjacent ends disposed within said opening; and
   a bearing assembly for supporting said adjacent ends within said opening, said bearing assembly being movable along said axis relative to said center support for permitting said second shaft to be adjusted along said axis relative to said first shaft upon assembly.

2. The transmission as set forth in claim 1 wherein said bearing assembly includes a carrier disposed within said opening for sliding therein along said axis, and bearings interposed between said carrier and said adjacent ends for reducing the friction between said shafts and said carrier when said shafts rotate about said axis.

3. The transmission as set forth in claim 2 wherein said carrier further includes a flange having an aperture and a fastener disposed within said aperture and connected to said center support for permitting said carrier to move along said axis while preventing said carrier from rotating about said axis.

4. The transmission as set forth in claim 3 wherein said fastener includes a stop for predetermining a gap size which limits the movement of said carrier along said axis.

5. The transmission as set forth in claim 2 wherein said bearings are roller bearings.

6. The transmission as set forth in claim 5 wherein said roller bearings further include at least one cup pressed into the carrier, a cone pressed onto each of the adjacent ends of the first and second shafts, and rollers interposed between said cup and cones.

7. The transmission as set forth in claim 6 wherein said roller bearings share one cup.

8. The transmission as set forth in claim 1 wherein said first shaft is a main countershaft and said second shaft is an auxiliary countershaft.

9. The transmission as set forth in claim 1 wherein said first and second shafts each have opposite ends opposing said adjacent ends and are supported by said housing, said opposite end of said first shaft being supported by an unshimmed bearing and said opposite end of said second shaft being supported by a shimmed bearing.

10. A transmission for use in a vehicle comprising:

a housing having a center support with an opening;

first and second shafts being coaxial along an axis and having adjacent ends disposed within said opening, said first and second shafts each having opposite ends opposing said adjacent ends supported by said housing;

an unshimmed bearing for supporting said opposite end of said first shaft;

a bearing assembly for supporting said adjacent ends within said opening, said bearing assembly being movable along said axis relative to said center support for permitting said second shaft to be adjusted along said axis relative to said first shaft upon assembly; and a shimmed bearing for supporting said opposite end of said second shaft.

11. The transmission as set forth in claim 10 wherein said unshimmed bearing is a first bearing in abutting relationship to said housing along said axis thereby preventing said first bearing form moving along said axis relative to said housing.

12. The transmission as set forth in claim 10 wherein said shimmed bearing includes a second bearing and a shim adjacent said second bearing for preventing said second bearing from moving along said axis relative to said housing.

13. A method of shimming shafts in a transmission during installation comprising the steps of:

(a) installing a first bearing into a housing such that it is grounded;

(b) installing a first shaft having first and second ends such that the first end is supported in the first bearing;

(c) installing a bearing assembly into the housing such that the second end is supported in the bearing assembly;

(d) installing a second shaft having third and fourth ends such that the third end is supported in the bearing assembly;

(e) determining a desired bearing position for a second bearing at which position a desired tolerance is obtained between the shafts and the bearings; and (f) installing the second bearing into the housing at the desired bearing position such that said fourth end is supported in the second bearing.

14. The method as set forth in claim 13 wherein step (e) includes applying a preload to the fourth end to determine a shim size.

15. The method as set forth in claim 14 further comprising after step (f) the step of:

(g) installing a shim of the determined shim size in the housing adjacent to the second bearing.

16. The method as set forth in claim 15 further comprising after step (g) the step of:

(h) installing an end cap onto the housing and adjacent to the shim so that the second bearing is not permitted to move from the desired bearing position.

* * * * *